United States Patent [19]

Spivey et al.

[11] Patent Number: 4,980,870
[45] Date of Patent: Dec. 25, 1990

[54] ARRAY COMPENSATING BEAMFORMER

[76] Inventors: Brett A. Spivey, 131 Seeman, Encinitas, Calif. 92024; Edward G. Newman, 8660 D Miramar Rd. #197; Paul A. Johnson, 10369 Gold Coast Pl., both of San Diego, Calif. 92126

[21] Appl. No.: 204,753

[22] Filed: Jun. 10, 1988

[51] Int. Cl.$^5$ .............................................. G01S 3/00
[52] U.S. Cl. .................................. 367/121; 367/105; 367/129
[58] Field of Search ................. 367/103, 105, 12, 118, 367/119, 121, 125, 129; 342/154, 157, 368, 371, 373, 377, 380, 383; 364/724.17, 724.19

[56] References Cited

U.S. PATENT DOCUMENTS 4,454,597 6/1984 Sullivan .

OTHER PUBLICATIONS

Implementation of Adaptive Array Algorithms, Robert Schreiber, Assp.; vol. Assp-34, Oct. '86.
The Forgotten Algorithm in Adaptive Beamforming, NATOASI "Aspects of Signal Processing", E. B. Lunde, p. 411–421; D. Reidel Pub. (1981).
Adaptive Beamforming with Emphasis on Narrowband Implementation in "Underwater Acoustics and Signal Processing", O. B. Gammelsaeter, p. 307–326, D. Reidel Pub. (1981).
Systolic Array Adaptive Beamforming, Norman Owsley, Nustec. Rep. 7981, Sep. 21, 1987.

Primary Examiner—Thomas H. Tarcza
Assistant Examiner—Daniel T. Pihulic

[57] ABSTRACT

A compensating beamformer which requires orders of magnitude fewer calculations that prior art methods. A compensating beamformer is provided which comprises a plurality of sensing elements and a plurality of analog-to-digital converters, for converting incoming analog signals to digital form. Digital signals from at least four such elements are used to compute phase angle information which is combined to form a matrix of input data in the frequency domain. An unweighted steering vector is determined to sample data from the target direction. A corrector matrix is calculated based on input data from sensing elements. That corrector matrix along with its inverse, which is determined recursively, is used in combination with the unweighted steering vector to determine an optimal steering vector. The input data in the frequency domain are then multiplied by the optimal steering vector to obtain signals in the directions of interest. In preferred embodiments of this invention these calculations are repeated systolically to provide optimal steering vector updates on an essentially real-time basis.

5 Claims, 3 Drawing Sheets $$R_1(\omega_m) = \langle x_{ik}(\omega_m) x_{jk}^*(\omega_m) \rangle$$

$$d_1 = e^{j\omega_m \tau_{np}}$$

$$\underline{v}_k^A = R_{m,k-1}^{-1} \underline{x}_k$$

$$c_k = \frac{1}{u\left(\frac{u}{1-u} + \underline{x}_{m,k}^H \underline{v}_k^A\right)}$$

$$R_{mk}^{-1} = \left(\frac{1}{u}\right) R_{m,k-1}^{-1} - c_k \underline{v}_k^A \underline{v}_k^{AH}$$

$$\underline{v}_k^B = \underline{d}_m \underline{v}_k^A$$

$$\underline{v}_k^C = \left(\frac{1}{u}\right) \underline{v}_{k-1}^C - c_k \left|\underline{v}_k^B\right|^2$$

$$\underline{s}_{m,k} = \frac{\underline{v}_k^B}{\underline{v}_k^C}$$

FIG. 3

ARRAY COMPENSATING BEAMFORMER

The present invention relates to compensating beamformers and more particularly to compensating beam formers having large numbers of detectors.

BACKGROUND OF THE INVENTION

Beamforming systems are well known in the art. Typically such systems comprise an array of sensing elements for which the output of each sensing element is delayed or phase shifted in such a fashion as to improve signal strengths in particular directions. Methods exist for nulling out or minimizing the effect of interference signals. More effective methods involve use of weighting factors applied to input data to improve the signal to interference and noise ratio (SINR). Some of these methods involve systolic calculation of new weighting factors on an essentially real-time basis. In general SINR's are improved by increasing the number of sensing elements. However, as the number of elements increase, for example beyond 500, the number of calculations required to determine these weighting factors become unmanageably large using prior art techniques.

SUMMARY OF THE INVENTION

The present invention provides a compensating beamformer which requires orders of magnitude fewer calculations than prior art methods. A compensating beamformer is provided which comprises a plurality of sensing elements, a plurality of analog-to-digital converters, for converting incoming analog signals to digital form. Digital signals from at least four such elements are used to compute phase angle information which is combined to form a matrix of input data in the frequency domain. An unweighted steering vector is determined to sample data from the target direction. A corrector matrix is calculated based on input data from sensing elements. That corrector matrix along with its inverse, which is determined recursively, is used in combination with the unweighted steering vector to determine an optimal steering vector. The input data in the frequency domain are then multiplied by the optimal steering vector to obtain signals in the directions of interest. In preferred embodiments of this invention these calculations are repeated systolically to provide optimal steering vector updates on an essentially real-time basis.

BRIEF DESCRIPTION OF THE DRAWINGS

FIG. 3 is a diagram showing a preferred method of determining an optimal signal output.

DESCRIPTION OF EQUIPMENT PREFERRED EMBODIMENTS

Figure 1:
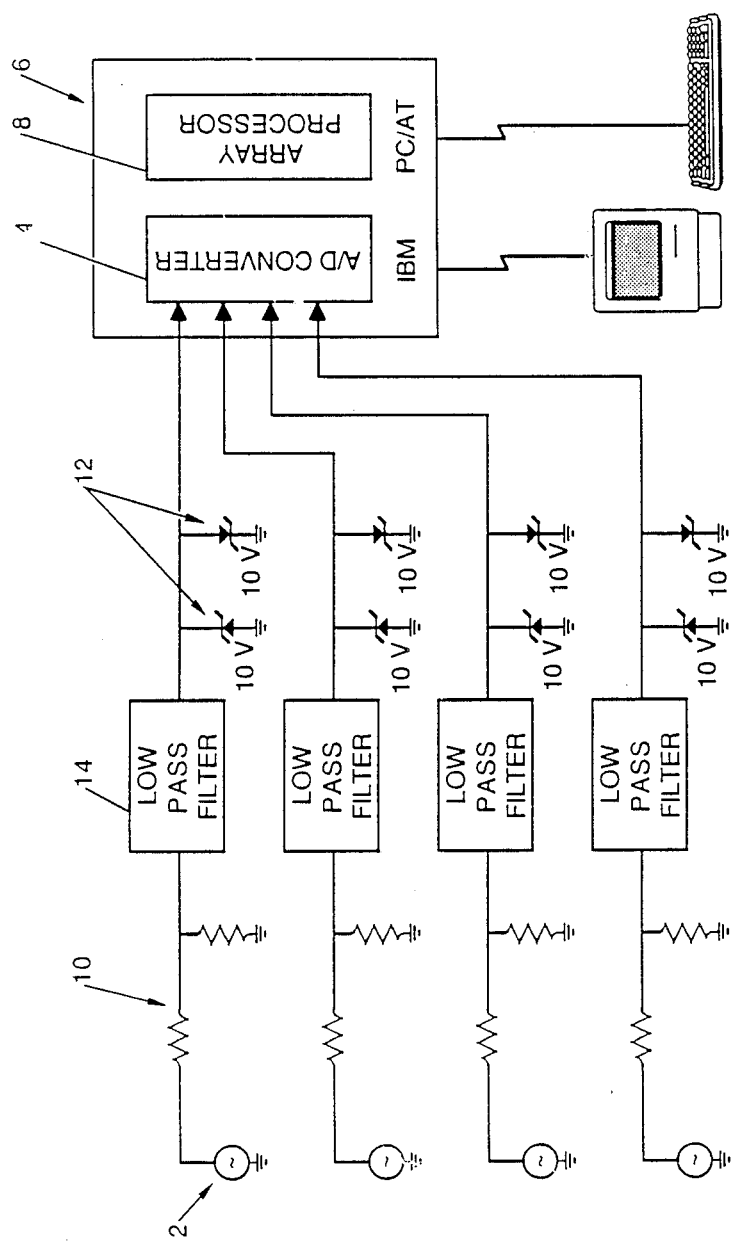
FIG. 1 in a diagram of a simple embodiment of the present invention.

A simple embodiment of the present invention is described by reference to FIG. 1. The system is composed of an array of four acoustic sensors 2, analog to digital (A/D) converters 4, and a standard personal computer 6 such as an IBM PC/AT. A plug-in array processor card for the personal computer 8 such as the DSP32-PC from Communications Automation & Control provides computational requirements. The acoustic sensors 2 are piezoelectric microphones typically used for underwater listening. The A/D converters 4 which are on a plug-in card for the personal computer transform the output signals of the piezoelectric microphones to the digital information required by the computer. The personal computer coordinates all the signal processing functions and acts as a display device.

Piezoelectric devices are used as underwater acoustic sensors because their acoustic impedance is close to that of water (allowing a maximum transfer of energy from the water to the sensor or vice-versa), and the same piezoelectric device may be used for both listening (receiving) and transmitting. A voltage divider network 10 at the output of the piezoelectric sensors reduces the range of signal voltage supplied to the A/D converters when receiving. Zener diodes 12 insure that voltages with magnitude greater than ten volts do not enter the A/D converters. The low pass filter 14 is an R-C network with a cut-off frequency of 100 Hz. The A/D converters such as model #DAA 10070 made by Personal Computing Tools, Incorporated would be satisfactory. The A/D conversion rate is set at 250 Hz and the resolution is 16 bits. This data acquisition and control system is provided with high level language routines that allow programs written in C, Basic, Pascal, or assembly languages to control and access the A/D converters. The A/D converter system interfaces to the personal computer through a card that occupies a single expansion slot inside the PC.

The personal computer is programmed to start the analog to digital conversion process, read the data from the A/D converter board into the array processor's memory, start the array processor, and then output the processed signal data to the screen. The array processor card implements the signal processing algorithm described below. High level language data input routines are provided with the data acquisition system. Data output to the screen is easily performed with the PRINT statement in Basic and the printf function in "C". The signal processing operations performed by the computer are programmed in compiled Basic or "C".

BEAMFORMING

The beamforming operations allow the overall system to sense in a particular desired direction. It is also desirable, when sensing in a particular direction, to hear only sounds that emanate from that direction. However, sidelobes are present that make the system sense in directions other than only the direction that is wanted. A way to minimize this problem is to cause the sidelobes of the receiving array to be pointed in quiet directions, while the main lobe points in the direction of interest. This provides for a situation which maximizes the SINR.

THEORY

A convenient discrete frequency domain representation of the broadband data from an N-sensor array is given by the vector $x_K$ with transpose $x_k^T$ specified by $$x_k^T = [x_{1k}(\omega_1) \ldots x_{Nk}(\omega_1) x_{1k}(\omega_2) \ldots x_{Nk}(\omega_2) \ldots x_{1k}(\omega_m) \ldots x_{Nk}(\omega_m)] \quad (1)$$

$$= [x_{1k}^T x_{2k}^T \ldots x_{mk}^T]$$

where $$x_{ik}(\omega_m) = \frac{1}{\sqrt{T}} \int_{\tau_k - \frac{T}{2}}^{\tau_k + \frac{T}{2}} x_i(\tau) e^{-j\omega_m \tau} d\tau \qquad (2)$$

with $x_i(\tau)$ the output time-domain waveform of the i-th sensor and $\omega_m$ the m-th discrete radial frequency, $$\omega_m = 2\pi m/T \; 0 \leq m \leq M - 1. \qquad (3)$$

Therefore, the elements of vector $x_k$ are seen to be discrete Fourier coefficients of $x_i(\tau)$ over the interval $(\tau_k - T/2, \tau_k + T/2)$. When the observation time, T is large with respect to the inverse bandwidth of $x_i(\tau)$, the Fourier coefficient between frequencies become uncorrelated. We shall assume that this condition is satisfied and that the waveform $x_i(\tau)$, $1 \leq i \leq N$, are zero mean and wide sense stationary.

Consistent with the above waveform assumptions, the covariance matrix $R_m = R(\omega_m)$ at frequency m, is defined with the ij-th element $E[x_{ik}(\omega_m)x_{jk}^*(\omega_m)]$. The covariance matrix for the Fourier coefficient vector $x_k(\omega_m)$ is an MN-by-MN block diagonal matrix with the $R_m$ as the m-th N-by-N main block diagonal element. A beamformer filter $w_k$ at time $\tau_k$ is now defined in terms of conjugate transpose (indicated by superscript H) as $$w_K^H = [w_{1k}^*(\omega_1) \ldots w_{Nk}^*(\omega_1) w_{1k}^*(\omega_2) \ldots w_k^*(\omega_2) \ldots w_{1k}^*(\omega_M) \ldots w_{Nk}^*(\omega_M)] \qquad (4)$$

$$= [w_{k1}^H w_{k2}^H \ldots w_{kM}^H]$$

the total broadband output power of the beamformer is defined as the variance $$\begin{aligned} \sigma_2 &= E[|w_k^H x_k|^2] \\ &= w_k^H E[x_k x_k^H] w_k \\ &= \sum_{m=1}^{M} w_{mk}^H R_m w_{mk}. \end{aligned} \qquad (5)$$

The requirement for a distortionless spectral response to a signal with the steering vector $d_{mp}$ at frequency $\omega_m$ is equivalent to the constraint $$Re[w_{mk}^H d_{mp}] = 1 \text{ and } Im[w_{mk}^H d_{mp}] = 0, \; 1 \leq m \leq M \qquad (6)$$

on the filter weight vector $w_{mk}$. The steering vector $d_{mp}$ has its n-th element $\exp(j\omega_m \tau_{np})$, i.e., $$d_{mpn} = e^{j\omega_m \tau_{np}} \qquad (7)$$

where $\tau_{np}$ is the relative time delay to the n-th sensor for a signal in the p-th direction. Using the method of undetermined Lagrange multipliers, $$\sigma^2 = \sum_{m=1}^{M} w_{mk}^H R_m w_{mk}$$

is minimized subject to the above constraints on $Re[w_{mk}^H d_{mp}]$ and $Im[w_{mk}^H d_{mp}]$ if the criterion function $$v = \sum_{m=1}^{M} [w_{mk}^H R_m w_{mk} + 2\lambda_{Rm}(Re[w_{mk}^H d_{mp}]) + 2\lambda Im[w_{mk}^H d_{mp}])] \qquad (8)$$

is minimized with respect to the real and imaginary parts of $w_{mk}$, simultaneously. The solution to this problem is known to be $$w_{mpk} = \frac{d_{mp} R_{m,k}^{-1}}{d_{mp} R_{m,k}^{-1} d_{mp}^H}, \; 1 \leq m \leq M \qquad (9)$$

where the beam index p indicates that a unique beam/filter vector $w_{mpk}$ is required for each of the $B(1 \leq p \leq B)$ beam steering signal direction.

Thus, the optimal signal output is determined by $$s_{mpk} = w_{mpk} x_{mk}. \qquad (10)$$

In our preferred embodiment w is constantly being updated systolically as new data is received. This method of creating a new set of steering vectors, based on recent data is known as adaptive beamforming.

In order to determine $w_{mpk}$, we first determine correction matrix $R_m$. The inversion of $R_m$ in the usual manner would require on the order of $N^3$ operations, where N is the number of sensors (one of the dimensions of matrix w). Using this direct method of calculating the optimal steering vectors is not practical for large number of sensors if the system is to be used in a real-time application.

Our improved approach reduces the number of operations that must be performed to calculate the set of optimal steering vectors to order $N^2$. We update the optimal steering vectors through the use of a recursion formula for $R^{-1}$. For the m-th frequency at time $\tau_k$:

$$R_{m,k}^{-1} = \frac{1}{\mu} R_{m,k-1}^{-1} -$$

$$R_{m,k-1}^{-1} x_{m,k} x_{m,k}^H R_{m,k-1}^{-1} / \left( \frac{\mu}{1 - \mu} + x_{m,k}^H R_{m,k-1}^{-1} x_{m,k} \right) \qquad (11)$$

where $\mu$ is a smooth factor ($0 < \mu < 1$) that implements the exponentially weighted time averaging operation.

By calculating $R^{-1}$ recursively, the need to perform matrix inversion is eliminated. Only matrix * vector and vector * vector multiplications are required. This reduces the number of operations required from order $N^3$ to order $N^2$ (where N is the number of sensors). This reduction in the number of operations is very significant for large systems.

The calculations of $R_{m,k}$ and $s_{m,k}$ may be combined in the following manner:

At time $\tau_k$:

$$s_{m,k} = w_{m,k} x_{m,k} = (d_m R_{m,k}^{-1} x_{m,k})/(d_m R_{m,k}^{-1} d_m^H) \qquad (12)$$

So let $$v_k^A = R_{m,k-1}^{-1} x_k \qquad (13)$$

and $$c_k = 1 / \left[ \mu \left( \frac{\mu}{1 - \mu} + x_{m,k}^H x_k^A \right) \right]. \qquad (14)$$

Then $$R_{m,k}^{-1} = \frac{1}{\mu} R_{m,k-1}^{-1} - c_k v_k^A v_k^{AH} \quad (15)$$

let $$v_k^B = d_m v_k^A \quad (16)$$

and $$v_k^C = (d_m R_{m,k}^{-1} d_m^H)_{ii} = 1/u\, v_{k-1}^C - c_k |v_k^B|^2. \quad (17)$$

Then the signal is $$s_{m,k} = v_k^B / v_k^C. \quad (18)$$

So, to calculate the above elements it requires approximately the following number of operations.

| Element | Approximate Number of Operations |
|---|---|
| $v_{-k}^A$ | $MN^2$ |
| $c_k$ | $MN$ |
| $R_k^{-1}$ | 2 |
| $v_{-k}^B$ | $MNB$ |
| $v_k^C$ | $MB$ | where M is the number of frequencies, N is the number of sensors and B is the number of steering directions.. In this preferred embodiment $s_{m,k}$ is determined by:

$$s_{m,k} = v_k^B / v_k^C$$

and this requires about MB operations. Thus, the total number of operations in on the order of $$2MN^2 + MNB$$

FULL SCALE SYSTEM

A full scale implementation of a preferred embodiment is described by reference to FIG. 2. In this embodiment, N acoustic detectors 20 are provided. Low pass filter 22 and A/D converters 24 are provided for each detector. Microprocessors 26 provide a fast Fourier transform of the signals to a frequency domain. A multiplexor 28 accumulates all of the signals in frequency domain for time k. A high speed array processor 30 calculates $R(w_m)$ 32 and d 34. It calculates $R_{m,k}^{-1}$ recursively 36 $w_{mk}$ 38 and finally $s_{mk}$ 40. $s_{mk}$ is the signal vector of frequency m at time k for all directions p.

Figure 2:
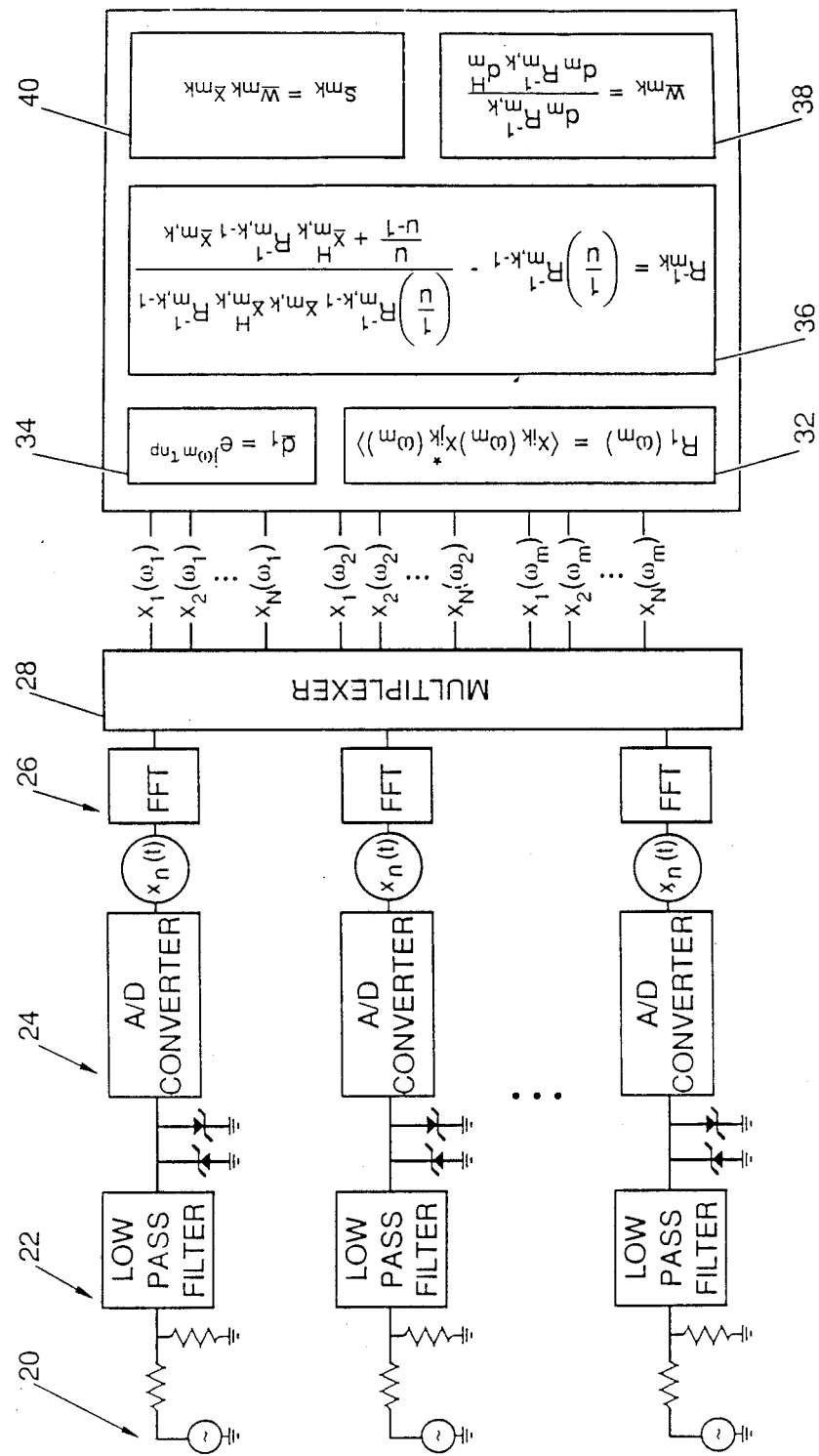
FIG. 2 in a diagram of a full scale implementation of a preferred embodiment of the present invention.

In another preferred embodiment described in FIG. 3, the signals are converted to a frequency domain as descried in FIG. 2; however, the determination of $s_{mk}$ is made as described in equations 13 through 19. With this approach the number of operation is further reduced by approximately a factor of 2

For an example the system can be designed for operation with the following parameters.

| | |
|---|---|
| Number of frequencies, M, | 1000 |
| Number of directions, B, | 1000 |
| Number of active detectors, N, | 1000 |

With these parameters approximately $4 \times 10^9$ operations would be required each cycle. With currently available fast computer facilities operating at 1.7 gigops, our preferred embodiments permit a cycle time of about 0.6 s. Prior art devices would require in excess of $10^{12}$ operations to accomplish the same result which would require cycle times of of about 600 s or 10 minutes.

The output of the system can be displayed by various methods. A preferred method is to display the output on one or more television screens on essentially a realtime basis with source direction being indicated by special position on the screen and intensity represented by brightness and particular frequencies (or an average of certain frequencies) being represented by colors.

Systems constructed in accordance with this invention are well suited for underwater location and monitor of sources of acoustic sources. But it could be also be used in the atmosphere to detect and monitor acoustic sources. In addition, by utilizing light or other electromagnetic detectors it could be utilized to detect and monitor that type of wave disturbance.

While the above description contains many specification, the reader should not construe these as limitations on the scope of this invention, but merely as exemplifications of referred embodiments thereof. Those skilled in the art will envision many other possible variations which are within its scope.

Accordingly, the reader is requested to determine the scope of the invention by the appended claims and their legal equivalents and not by the examples which have been given.

What is claimed is:

1. An array beamformer comprising:
   a plurality of sensing elements adapted to receive incoming signals and for transforming said incoming signals into a plurality of electrical analog signals,
   a converting means for receiving said plurality of said electrical analog signals from said corresponding plurality of sensing elements and for converting said plurality of electrical analog signals into a plurality of digital signals,
   a phase computing means for receiving said digital signals from said converting means, for computing therewith phase angle for said digital signals from said converting means and adding the phase angles in such a way as to produce a matrix of input data, $x(\omega_m)$ in the frequency domain, $$x_{m,k} = x_k(\omega_m)$$

a direction determination means for determining an unweighted steering vector, $d = e^{j\omega\tau}$,
   a correction determination means for determining for each d a corrector $R(\omega_m)$ where $R_{ij}(\omega_m) = <x_{ik}(\omega_m) x_{jk}^*(\omega_m)>$ where $<>$ denotes an approximation of average value,
   a recursive determination means for determining the inverse of $R_m$, that is $R_m^{-1}$, recursively,
   an optimal steering vector determination means for determining the optimal steering vector $w_{mpk}$ where $w_{mpk} = (d_{mp} R_{mk}^{-1})/(d_{mp} R_{mk}^{-1} d_{mp}^H)_{ij}$, and
   a signal estimator means for estimating in any direction p, time k and frequency m a signal, $s_{mpk}$ where said signal $s_{mpk}$ is estimated by $s = wx$.

2. The beamformer array of claim 1 wherein said plurality of sensing elements are a plurality of acoustic sensing elements.

3. The beamformer array of claim 2 wherein said plurality of acoustic sensing elements is a number of sensing elements $>500$.

4. A process for detecting a source of acoustic or electromagnetic waves amid noise and interference comprising the steps of:
  detecting incoming wave signals
  converting said incoming wave signal to a plurality of electrical analog signals,
  converting said analog signals into a plurality of digital signals,
  computing the phase of said digital signals and combining said signals with said phase to obtain a matrix of input data in the frequency domain,
  computing an unweighted steering vector, $d = e^{i\omega t}$,
  determining a corrector, $R(\omega)$ to maximize the signal to noise and interference ratio,
  making a recursive determination of the inverse of $R(\omega)$, $R(\omega)^{-1}$,
  determining an optimal steering vector w using d and $R(\omega)^{-1}$, and
  describing said wave as a function of direction, frequency and time based on said w and said matrix of input data in the frequency domain.

5. The process of claim 4 wherein an acoustic income wave signals are detected using a plurality of acoustic detectors.

* * * * *